(12) United States Patent
Masuda et al.

(10) Patent No.: US 7,103,842 B2
(45) Date of Patent: Sep. 5, 2006

(54) SYSTEM, METHOD AND PROGRAM FOR HANDLING TEMPORALLY RELATED PRESENTATION DATA

(75) Inventors: Hiroki Masuda, Kanagawa (JP); Takuhiko Takatsu, Tokyo (JP); Hiroyuki Bando, Kanagawa (JP); Yukio Takeyari, Kanagawa (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 09/947,973

(22) Filed: Sep. 6, 2001

(65) Prior Publication Data

US 2002/0085022 A1 Jul. 4, 2002

(30) Foreign Application Priority Data

Sep. 7, 2000 (JP) ............................. 2000-272244

(51) Int. Cl.
*G06F 3/00* (2006.01)
(52) U.S. Cl. ...................... 715/731; 715/730; 715/716; 715/727; 715/500.1; 715/512; 704/278
(58) Field of Classification Search ................ 345/731, 345/730, 732, 727, 728, 716, 717, 726, 978, 345/700; 715/500.1, 500, 530, 531, 700, 715/512; 704/231, 270, 278, 251
See application file for complete search history.

(56) References Cited

U.S. PATENT DOCUMENTS

| 5,535,063 | A | * | 7/1996 | Lamming | ............ | 715/500.1 X |
| 5,717,879 | A | * | 2/1998 | Moran et al. | ................ | 345/716 |
| 6,072,480 | A | * | 6/2000 | Gorbet et al. | ................ | 345/730 |
| 6,320,598 | B1 | * | 11/2001 | Davis et al. | ......... | 715/500.1 X |
| 6,336,093 | B1 | * | 1/2002 | Fasciano | ...................... | 704/278 |
| 6,342,904 | B1 | * | 1/2002 | Vasudevan et al. | ..... | 715/730 X |
| 6,544,294 | B1 | * | 4/2003 | Greenfield et al. | .. | 715/500.1 X |
| 6,665,835 | B1 | * | 12/2003 | Gutfreund et al. | ....... | 715/500.1 |
| 6,834,371 | B1 | * | 12/2004 | Jensen et al. | ............. | 715/500.1 |
| 2001/0032151 | A1 | * | 10/2001 | Paul et al. | ..................... | 705/26 |

* cited by examiner

*Primary Examiner*—Raymond J. Bayerl
(74) *Attorney, Agent, or Firm*—Frommer Lawrence & Haug LLP; William S. Frommer

(57) ABSTRACT

Realizing a presentation system which can present picture data and voice data in a simplified manner after shooting and picking up pictures by a digital still camera, etc. and recording voices by a voice recorder, etc. Firstly, when the presentation system executes the program, a folder will be selected to specify a recording area in the personal computer 10 (step 1). After obtaining temporal information of all picture data and voice data in the folder, the presentation system performs relating operation for pages of slides so that the picture data and the voice data correspond to the slides at the time of data presentation (step 2). Next, the presentation system makes the user select whether information processing for data will be performed or not (step 3). If the user intends to perform the information processing for data, the flow advances to step 4, in which the user can perform the information processing for data such as voice recognition, text inputting, or selecting static pictures from moving pictures, if necessary, for each of the related slide data in the presentation system.

5 Claims, 6 Drawing Sheets

SYSTEM, METHOD AND PROGRAM FOR HANDLING TEMPORALLY RELATED PRESENTATION DATA

BACKGROUND OF THE INVENTION

1. Field of the Invention

The present invention relates to a presentation system for synthetically presenting information intended by an editor using picture information and voice information, a method for generating presentation data, and a program for generating presentation data.

2. Description of Related Art

Conventionally, when an editor attempts to present pictures shot and picked up by a digital still camera, etc. and voices recorded by a voice recorder, etc. by using a personal computer, the editor has to paste picture data and voice data manually on a presentation software.

In pasting picture data and voice data on the presentation software, the editor is required to have sophisticated skills, and plenty of time is necessary to do this work. Furthermore, some data which are originally related to each other temporally are not dealt with as such by the personal computer. So, the editor has to consider the data relation, which increases the work of the editor.

SUMMARY OF THE INVENTION

It is therefore an object of the present invention to overcome the above-mentioned drawbacks by providing a presentation system which can present picture data and voice data in a simplified manner after shooting and picking up pictures by a digital still camera, etc. and recording voices by a voice recorder, etc., a method for generating presentation data, and a program for generating presentation data.

According to the present invention, there is provided a presentation system including:
  means for sequentially relating picture data and voice data to each other as slides for presentation to automatically generate presentation data; and
  means for displaying the automatically generated presentation data.

According to the present invention, there is provided a method for generating presentation data including the steps of:
  judging temporal matching of picture data and voice data based on shooting time of pictures and recording time of voices stored in a storing unit;
  processing the picture data and the voice data which are judged to be temporally matched in the temporal matching judging step.

According to the present invention, there is provided a program for generating presentation data executing the steps of:
  judging temporal matching of picture data and voice data based on shooting time of pictures and recording time of voices stored in a storing unit;
  processing the picture data and the voice data which are judged to be temporally matched in the temporal matching judging step.

According to the present invention, picture data and voice data can be presented in a simplified manner after shooting and picking up pictures by a digital still camera, etc. and recording voices by a voice recorder, etc.

These objects and other objects, features and advantages of the present invention will become more apparent from the following detailed description of the preferred embodiments of the present invention when taken in conjunction with the accompanying drawings.

DESCRIPTION OF THE PREFERRED EMBODIMENTS

Preferred embodiments according to the present invention will further be described below with reference to the accompanying drawings. In these embodiments, a method for generating presentation data, that is a method for automatically generating presentation data based on temporal information by the use of a presentation system composed of a software performing the method and a personal computer executing the software will be explained.

In the presentation system, a personal computer executes a software which performs the method for automatically generating presentation data based on temporal information. Thus, picture data and voice data are sequentially related to each other as slides for presentation based on shooting time of pictures shot and picked up by a digital still camera, etc. and recording time of voices recorded by a voice recorder, etc., and presentation data is generated automatically. Details of a program which performs the method for automatically generating presentation data will be explained later.

Figure 1:
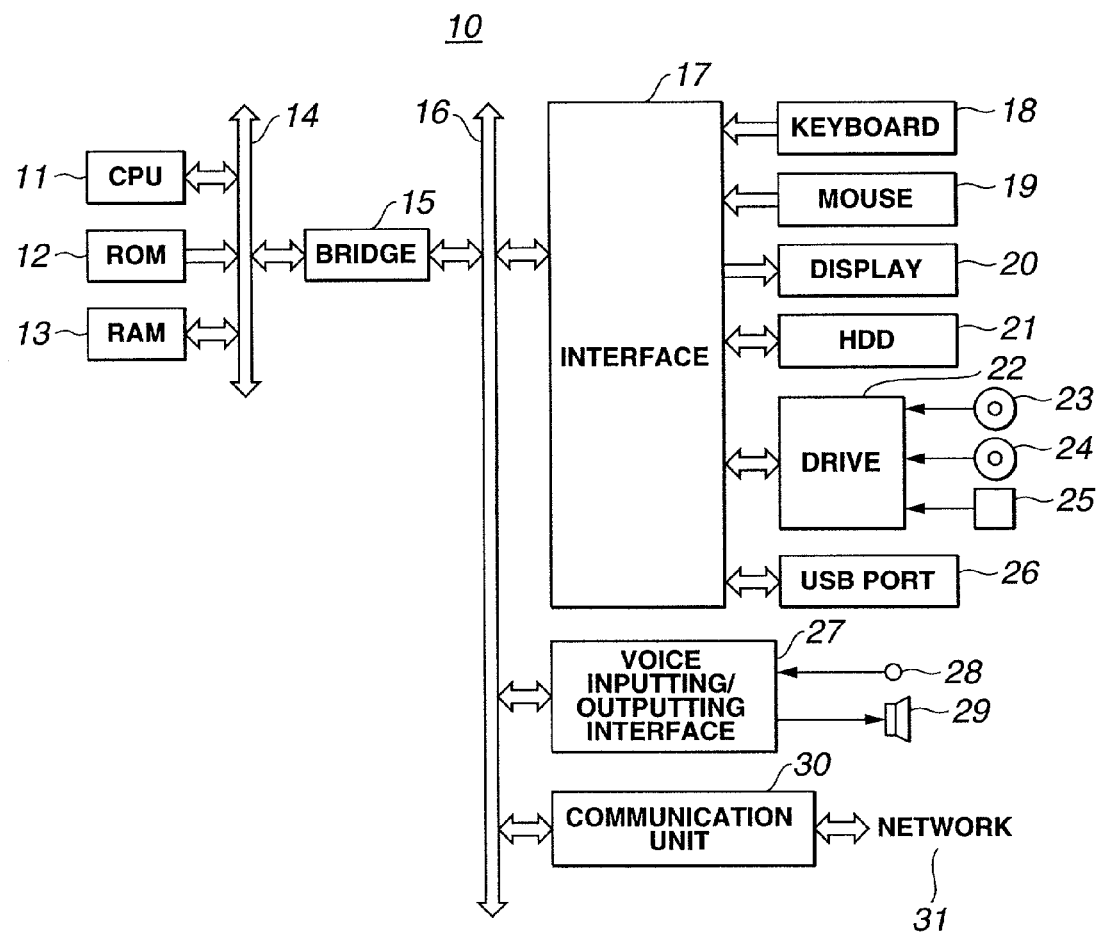
FIG. 1 shows a block diagram of a personal computer configuring the presentation system according to the present invention.

Referring to FIG. 1, the configuration of a personal computer 10 will be explained. The personal computer 10 includes a CPU (Central Processing Unit) 11, a ROM 12, and a RAM 13. The CPU 11 executes an application program which performs the method for automatically generating presentation data based on temporal information and an OS (Operating System). The ROM 12 stores a program to be executed by the CPU 11 and basically fixed parameters among operating parameters. The RAM 13 stores a program for activating the CPU 11 and variable parameters in activating the CPU 11. The CPU 11, ROM 12, and RAM 13 are mutually connected by a host bus 14 which may be a CPU bus.

The personal computer 10 further includes a bridge 15. The host bus 14 is connected to an external bus 16 which may be a PCI (Peripheral Component Interconnect/Interface) bus via the bridge 15. The personal computer 10 further includes a keyboard 18, a mouse 19, a display 20, and an HDD (Hard Disc Drive) 21. When inputting various commands to the CPU 11, the user operates the keyboard 18. When directing the pointing operation or selecting operation on a screen of the display 20, the user operates the mouse 19. The display 20 may be an LCD (liquid crystal display) or a CRT (Cathode Ray Tube), and displays various information in the form of texts or pictures. The HDD 21 drives a hard disc to record/reproduce a program to be executed by the CPU 11 and information. In this embodiment, the application program which performs the method for automatically generating presentation data based on temporal information is recorded in advance. The application program is reproduced and supplied to the RAM 13. The application program which performs the method for automatically generating presentation data based on temporal information is recorded in various recording media mounted to a drive 22, which will be described later, or may be supplied to the RAM 13.

The personal computer 10 further includes a drive 22. The drive 22 reads out data or programs recorded in a magnetic disc 23, an optical disc (including a compact disc) 24, or a magneto-optical disc 25, which are mounted thereto, and supplied the read out data or programs to the RAM 13 via an interface 17, the external bus 16, bridge 15, and host bus 14.

The personal computer 10 further includes a USB (Universal Serial Bus) port 26. The USB port 26 is connected to a portable device, not shown, by a USB cable. The USB port 26 outputs data (including such as contents data or commands for the portable device) supplied from the HDD 21, CPU 11, or RAM 13 via the interface 17, external bus 16, bridge 15, and host bus 14 to the portable device.

The keyboard 18, mouse 19, display 20, HDD 21, drive 22, and USB port 26 are connected to the interface 17. The interface 17 is connected to the CPU 11 by the external bus 16, bridge 15, and host bus 14.

The personal computer 10 further includes a voice inputting/outputting interface 27 and a loud speaker 29. The voice inputting/outputting interface 27 performs interface processing such as digital voice inputting/outputting or analog voice inputting/outputting for digital data or analog data supplied from an input terminal 28. The loud speaker 29 generates voices corresponding to contents data from the voice data supplied from the voice inputting/outputting interface 27.

The personal computer 10 further includes a communication unit 30. The communication unit 30 is connected to a network 31. The communication unit 30 stores data (such as request for registration or request for sending contents data) supplied from the CPU 11 or HDD 21 into packets of a predetermined form, and sends the stored data via the network 31. Also, the communication unit 30 receives data (such as authentication key data or contents data) stored in packets via the network 31, and sends the data to the CPU 11, RAM 13, or HDD 21.

Figure 2:
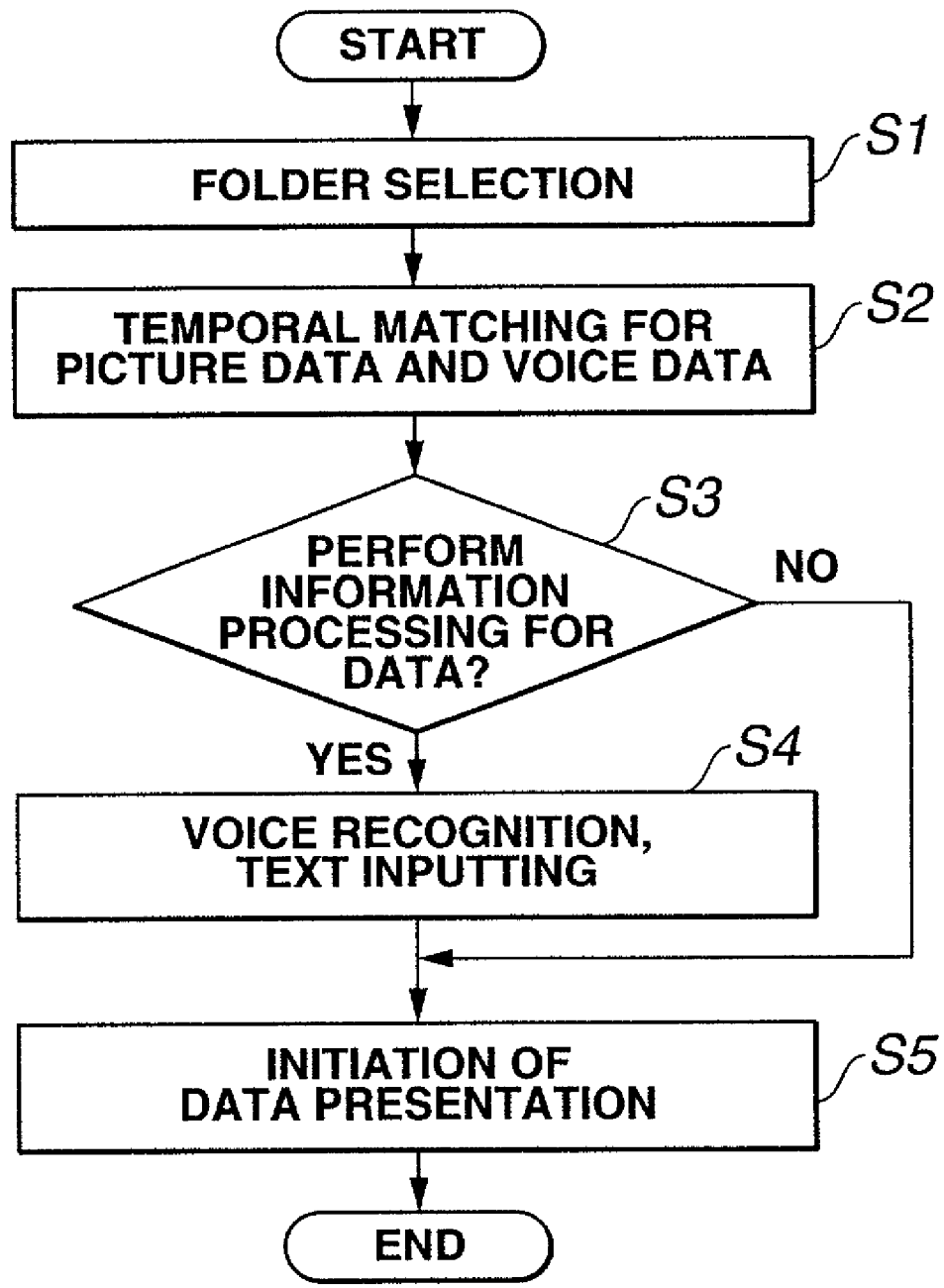
FIG. 2 shows a flow chart for explaining the operation of the presentation system according to the present invention.

Referring to FIG. 2, the flow for executing the application program which performs the method for automatically generating presentation data based on temporal information will be explained. Firstly, when the presentation system executes the program, a folder will be selected to specify a recording area in the personal computer 10 (step 1).

After obtaining temporal information of all picture data and voice data in the folder, the presentation system performs relating operation for pages of slides so that the picture data and the voice data correspond to the slides at the time of data presentation. That is, the picture data and the voice data are caused to be temporally matched (step 2).

Next, the presentation system makes the user select whether information processing for data will be performed or not (step 3). If the user intends to perform the information processing for data, the flow advances to step 4. In step 4, the user can perform the information processing for data such as voice recognition, text inputting, or selecting static pictures from moving pictures, if necessary, for each of the related slide data in the presentation system. After completion of the information processing for data in the presentation system, the presentation data is completed, and then data presentation is initiated (step 5).

Next, specific operation of the presentation system will be explained with reference to FIG. 3 to FIG. 7. The application program which performs the method for automatically generating presentation data based on temporal information will be referred to as a presensoft hereinafter.

Figure 3A:
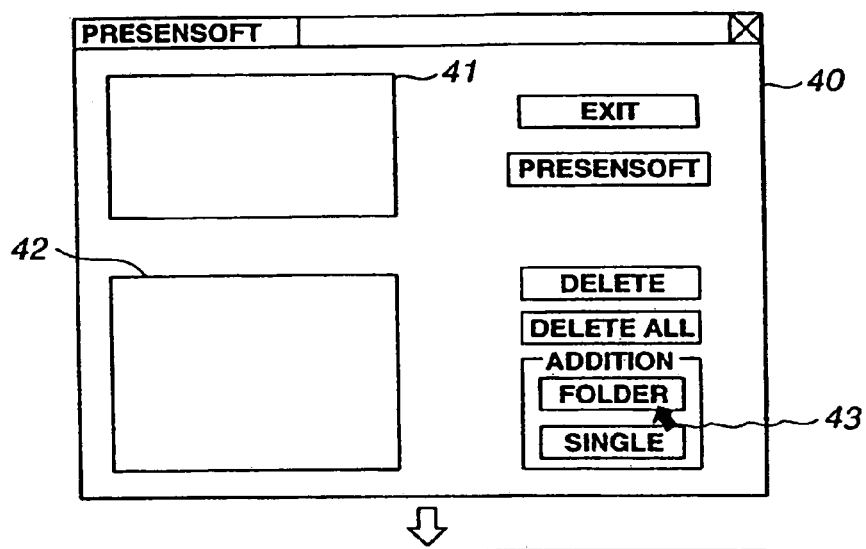
FIGS. 3A and 3B show first displayed images for explaining the operation of the presentation system according to the present invention.

When the presensoft is executed in the presentation system, a dialog 40 of the presensoft is displayed on the display 20 of the personal computer 10, as shown in FIG. 3A. The dialog 40 has arranged thereon a picture displaying area 41 and a list area 42. Furthermore, operation buttons such as "exit", "presensoft", "delete", "delete all", and further, "folder" and "single" in additional area are displayed in the dialog 40, which are to be pointed by a cursor 43 and clicked by the mouse 19.

Figure 3B:
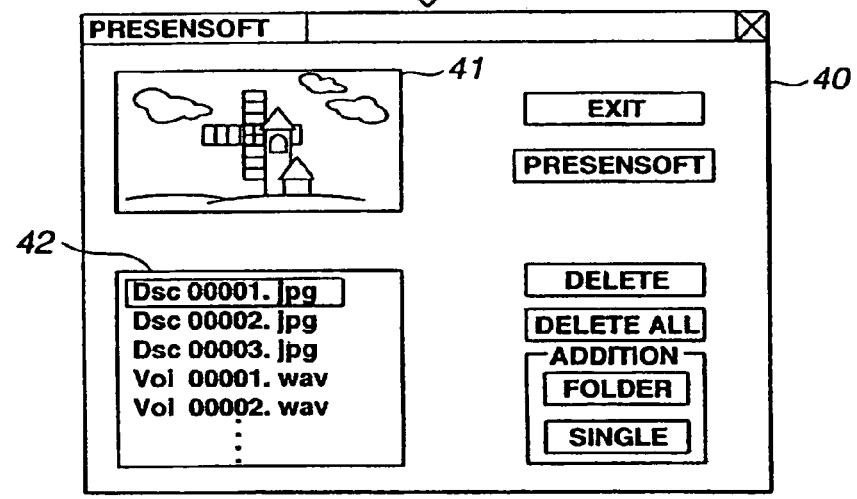

On pointing the displayed "folder" button by the cursor 43 and clicking the button by the mouse 19, a folder is selected, which step is the above-described step 1. After the folder selection, picture files included in the selected folder are enumerated in the list area 42 of the dialog 40, as shown in FIG. 3B. In case there exists a voice file in the folder whose recording time is close to the shooting time of a picture, the picture file of the picture is marked with "*" or is enclosed by a closing line, as shown in the list area 42 in FIG. 3B. At this time, the picture of the picture file enclosed by the closing line is displayed in the picture displaying area 41. Reproducing order of slides can be varied by performing "drag-and-drop" for the enumerated picture files.

Figure 4A:
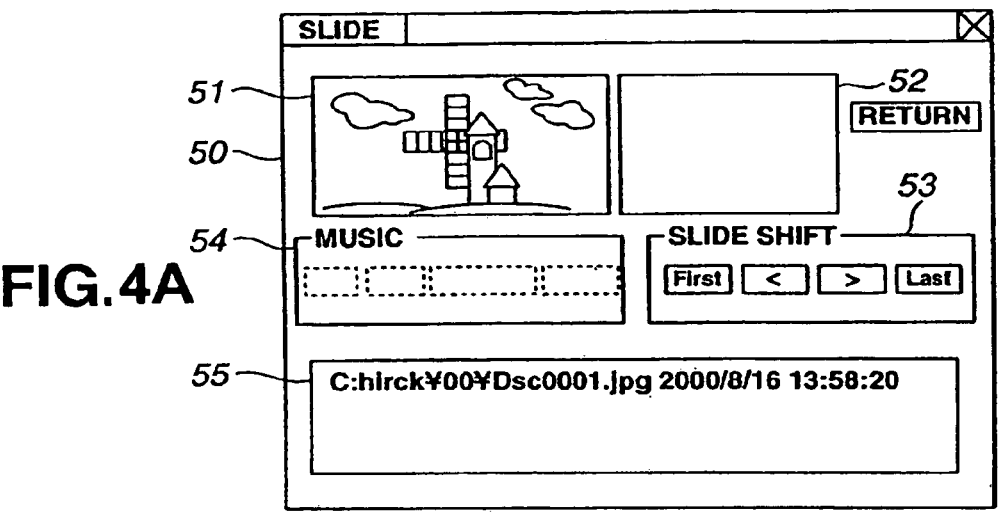
FIGS. 4A and 4B show second displayed images for explaining the operation of the presentation system according to the present invention.
Figure 4B:
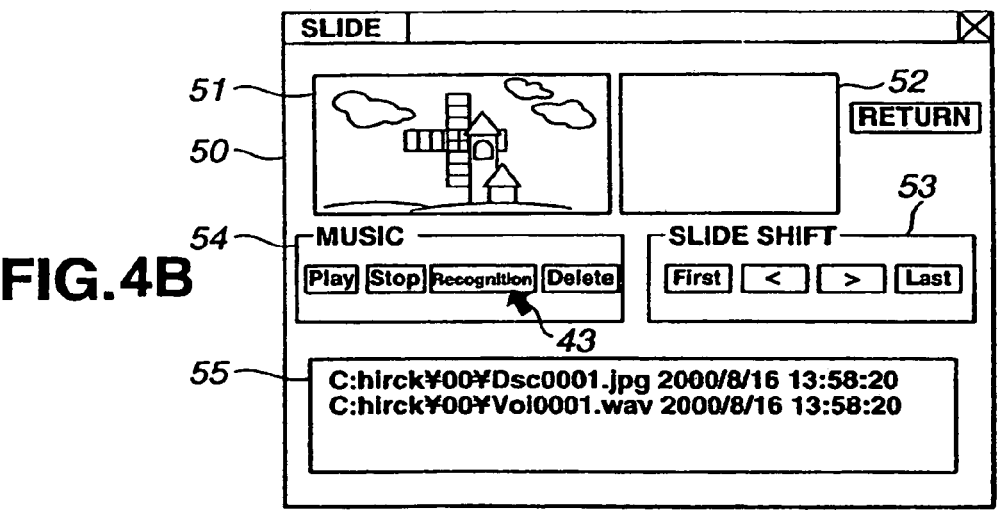

On double-clicking a picture file intended to be processed among the enumerated picture files, a dialog 50 is newly displayed on the display 20, as shown in FIG. 4A and FIG. 4B. The dialog 50 has arranged thereon a picture displaying area 51, a text displaying area 52, and a file displaying area 55. Furthermore, the dialog 50 has arranged thereon an operation button displaying area for music 54 and an operation button displaying area for slide shift 53. FIG. 4A shows the case in which a voice file is not related to a picture file, while FIG. 4B shows the case in which a voice file is related to a picture file.

Figure 5A:
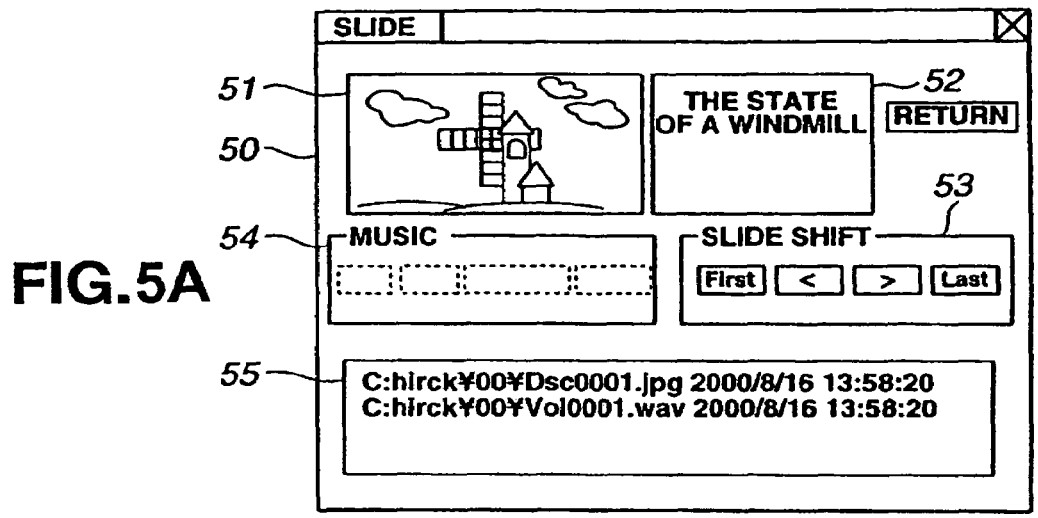
FIGS. 5A and 5B show third displayed images for explaining the operation of the presentation system according to the present invention.

Next, an example of the case in which a voice file is related to a picture file will be explained. The recording time of the voice file is equal to the shooting time of the picture file, and the picture file and the voice file are displayed in the file displaying area 55, as shown in FIG. 4B. On clicking a "recognition" button in the operation button displaying area for music 54, a text of "the state of a windmill" is displayed in the text displaying area 52 after performing voice recognition, as shown in FIG. 5A. In case a voice file is not related to a picture file or voice recognition is not performed correctly, another text can be added or the text can be edited.

Figure 5B:
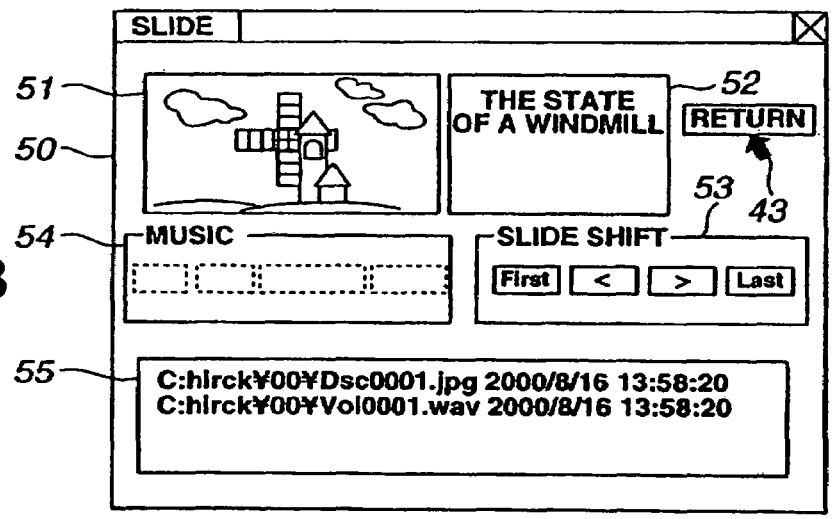
Figure 6:
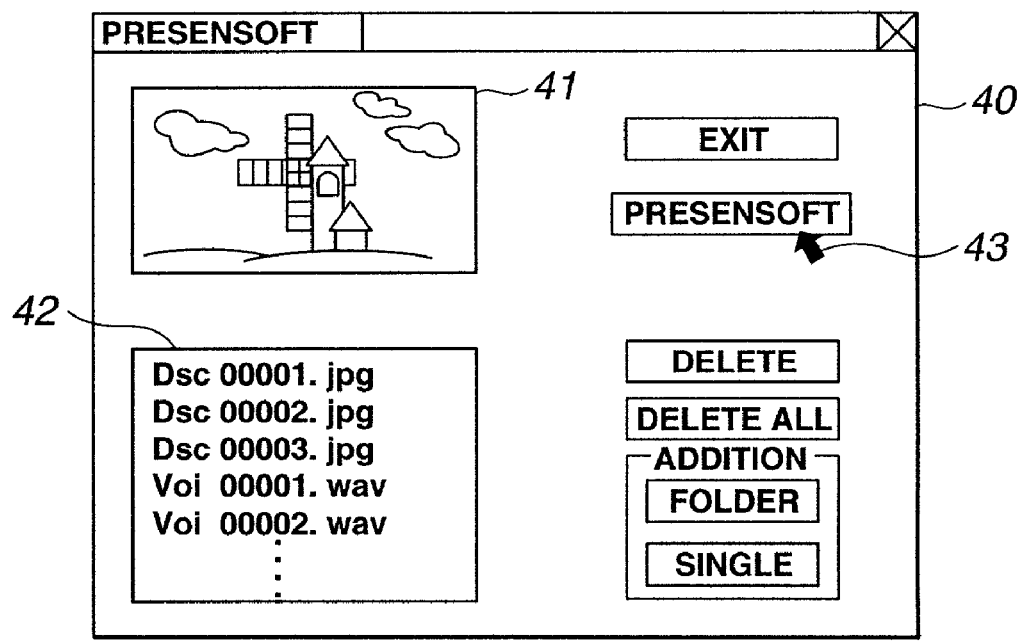
FIG. 6 shows a fourth displayed image for explaining the operation of the presentation system according to the present invention.
Figure 7:
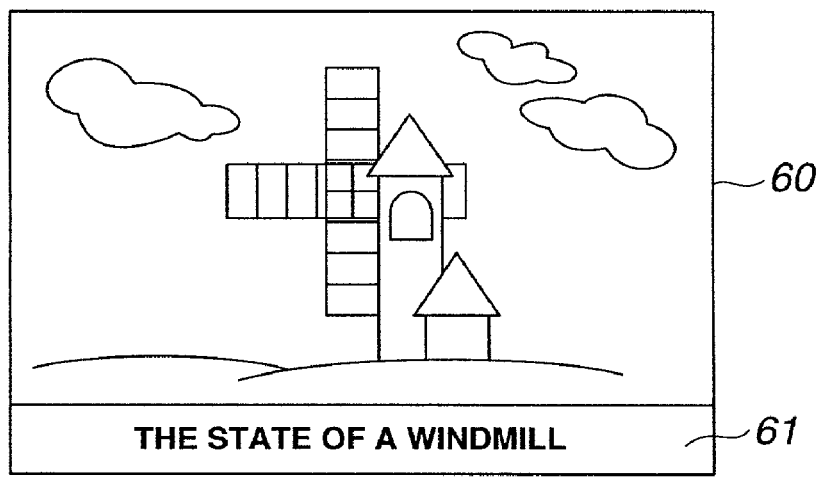
FIG. 7 shows a fifth displayed image for explaining the operation of the presentation system according to the present invention.

After completion of the necessary processing, on clicking a "return" button, as shown in FIG. 5B, the dialog 50 is closed and the dialog 40 is displayed again, as shown in FIG. 6. Then, on clicking a "presensoft" operation button, a picture 60 and a text 61 are displayed, and the data presentation is initiated, as shown in FIG. 7.

What is claimed is:

1. A presentation system to automatically generate presentation data based on temporal information comprising:

means for temporally relating picture data and voice data to each other as slides for presentation, wherein said means for temporally relating picture data and voice data relates said picture data to said voice data by comparing a shooting time of said picture data with recording times of said voice data and selecting voice data with a recording time that is closest to said shooting time; and means for displaying the automatically generated presentation data so that appropriate information regarding and included in the related picture data and voice data is displayed when the picture data is selected for processing, wherein said processing includes voice recognition, text inputting, or selecting static pictures from moving pictures, for each of the related slide data in the presentation system; and wherein after completion of the information processing for data in the presentation system, the presentation data is completed, and data presentation is initiated.

2. The presentation system as set forth in claim 1, wherein said appropriate information included in the voice data includes text data converted from voice data describing the picture data.

3. A method for automatically generating presentation data based on temporal information comprising the steps of:

selecting picture data and temporally relating the picture data to voice data, wherein said temporally relating picture data to voice data includes comparing a shooting time of said picture data with recording times of said voice data and selecting voice data with a recording time that is closest to said shooting time;

processing the temporally related picture data and voice data to generate slides for presentation; and displaying the presentation so that appropriate information regarding and included in the related picture data and voice data is displayed when the picture data is selected for processing, wherein said processing includes voice recognition, text inputting, or selecting static pictures from moving pictures, for each of the related slide data in the presentation system; and wherein after completion of the information processing for data in the presentation system, the presentation data is completed, and data presentation is initiated.

4. The method for generating presentation data as set forth in claim 3, wherein said processing the temporally related picture data and the voice data includes recognizing the voice data and converting the voice data to text data.

5. A computer readable storage medium for storing a program executed by a computer to automatically generate presentation data based on temporal information, the program comprising the steps of:

selecting picture data and temporally relating the picture data to voice data, wherein said temporally relating picture data to voice data includes comparing a shooting time of said picture data with recording times of said voice data and selecting voice data with a recording time that is closest to said shooting time;

processing the temporally related picture data and voice data to generate slides for presentation; and displaying the presentation so that appropriate information regarding and included in the related picture data and voice data is displayed when the picture data is selected for processing, wherein said processing includes voice recognition, text inputting, or selecting static pictures from moving pictures, for each of the related slide data in the presentation system; and wherein after completion of the information processing for data in the presentation system, the presentation data is completed, and data presentation is initiated.

* * * * *